US007845060B2

(12) United States Patent
Baur et al.

(10) Patent No.: US 7,845,060 B2
(45) Date of Patent: Dec. 7, 2010

(54) METHOD FOR THE PRODUCTION OF A CATCHING CONNECTION IN A LINEAR DRIVE

(75) Inventors: Harald Baur, Rottenburg (DE); Martin Rapp, Kernen (DE)

(73) Assignee: Festo AG & Co. KG, Esslingen (DE)

( * ) Notice: Subject to any disclaimer, the term of this patent is extended or adjusted under 35 U.S.C. 154(b) by 1134 days.

(21) Appl. No.: 10/591,141

(22) PCT Filed: Mar. 24, 2005

(86) PCT No.: PCT/EP2005/003130

§ 371 (c)(1),
(2), (4) Date: Aug. 30, 2006

(87) PCT Pub. No.: WO2005/100808

PCT Pub. Date: Oct. 27, 2005

(65) Prior Publication Data

US 2007/0186766 A1 Aug. 16, 2007

(30) Foreign Application Priority Data

Apr. 13, 2004 (DE) ....................... 10 2004 017 896

(51) Int. Cl.
*B23P 11/00* (2006.01)
*F16J 15/08* (2006.01)

(52) U.S. Cl. .................................. 29/525.13; 92/165 R

(58) Field of Classification Search .............. 29/525.13, 29/525, 458, 428; 92/165 R; 310/20, 12, 310/17, 75 R, 80
See application file for complete search history.

(56) References Cited

U.S. PATENT DOCUMENTS 7,199,494 B2 * 4/2007 Rapp et al. .................... 310/20
2009/0058198 A1 * 3/2009 Finkbeiner et al. ............ 310/12

FOREIGN PATENT DOCUMENTS

DE 101 16634 A1 10/2002
DE 203 16693 A1 1/2004
EP 0868965 10/1998

OTHER PUBLICATIONS

Viebach, Dieter, "Der Stirlingmotor, einfach erklärt und leicht gebaut," 1 Auflage 1998, Ökobuch Verlag, Staufen bei Freiburg, pp. 3, 4, 37 and 51.

* cited by examiner

*Primary Examiner*—John C Hong
(74) *Attorney, Agent, or Firm*—Hoffman & Baron, LLP

(57) ABSTRACT

A method of providing a linear drive with an axially play-free entrainment connection between at least one linearly travelling rod (5) and a guide unit able to be moved parallel thereto. Between a coupling member (26), projecting to the fore of the rod (5), of the guide unit and the terminal face (27) of the rod (5) adhesive (34) is applied and then the components are so screwed together that athwart the direction of displacement relative motion is still possible. Then the entire unit is shifted between its two terminal positions even prior to curing of the adhesive (34), the components then aligning themselves. After the adhesive is cured the screw connection is finally drawn tight.

9 Claims, 2 Drawing Sheets

METHOD FOR THE PRODUCTION OF A CATCHING CONNECTION IN A LINEAR DRIVE

The invention relates to a method for the production of an axially play-free entrainment connection between at least one rod mounted for linear movement and a guide unit adapted to slide linearly in parallelism to it in linear drive, a coupling member of the guide unit being adhesively bonded to the rod and extending to the fore of an end face of the rod when the entrainment connection has been produced.

FIELD OF THE INVENTION

A linear drive as disclosed in the European patent publication 0868965 B1 comprises at least one drive rod able to be shifted in relation to the housing, such rod being kinematically coupled in a manner free of axial play with a guide unit also linearly sliding on the housing. For the connection with the drive rod the guide unit possesses a coupling member designed as a yoke part, which extends to the fore of the drive rod and is connected with it in a manner free of play in the axial direction in order to produce an entrainment connection. Owing to shape and positioning inaccuracies of the individual components the application of a draw force to the attachment screw transverse forces may arise, which impair the parallelism of the drive rod and the guide unit, something which may result in stiff running of the drive rod and the guide unit and in increased wear and a reduction in the service life. A similar arrangement is disclosed in the German patent publication 101 16 634 C2.

BACKGROUND OF THE INVENTION

In the case of a linear drive disclosed in the German patent publication (utility model) DE 20316693 U1 an attempt was made to tackle the above mentioned problems by not having a screw connection and replacing it by a-plain adhesive join. More particularly when tensile forces are to be transmitted this design however reduces the load carrying capacity of the linear drive.

The possibility of joining together two parts by an adhesive joint is described in the textbook "Der Stirlingmotor, einfach erklaert und leicht gebaut" by Dieter Viebach, first edition 1998, published by Oekobuch Verlag, Staufen bei Freiburg, pages 3, 4, 37 and 51. The book explains that a hub to be secured in a flywheel by means of a two-component adhesive may be aligned in the flywheel as long as the two-component adhesive is not set.

One object of the present invention is to propose measures by which, while dealing with the wear problems render possible an entrainment connection with a high load carrying capacity within the force flow path of the movement unit of a linear drive.

SUMMARY OF THE INVENTION

This aim is to be achieved in the present invention in conjunction with a method of the type initially mentioned in as far as that after the application of the adhesive the coupling member is screwed by means of at least one attachment screw in such a manner axially to the rod that relative movements between the coupling member and the rod remain possible athwart the direction of displacement, that then even prior to curing of the adhesive the movement unit comprising the guide unit and the rod is displaced axially at least once between its two stroke end positions in relation to the housing of the linear drive, and that after subsequently curing of the adhesive the final screwing tight of the attachment screw is performed.

In this fashion the components to be connected are fixed in relation to each other so that during the following operation of tightening the at least one attachment screw there is no deflection of the components to be screwed.

Accordingly there is a connection which is both free of axial play and can resist heavy loads without making the guides present any stiffer. Prior to the curing of the adhesive exact alignment between the guide unit and the rod is achieved by at least one and preferably multiple reciprocations of the movement unit between the ends of the stroke, the preliminary fixation performed in this context ensuring the necessary axial entrainment owing to the at least one attachment screw without the relative transverse mobility of the components, required for mutual alignment, being reduced.

The method may be employed both when the end of the rod to be coupled with the guide unit and also when in this respect it is a question of a drive rod with for example—in the case of a fluid operated linear drive—with one drive piston or—in the case of electrically activated drive means.

Further advantageous developments of the invention are defined in the dependent claims.

The adhesive may readily be applied to a joint face, facing the rod, on the coupling member, which is not peripherally limited. As more particularly of interest however a design is preferred in which the joint face turned toward the rod, of the coupling member is provided on the floor of a recess, into which the rod may fit and into which the adhesive has previously been applied.

In the following account the invention will be explained with reference to the accompanying drawings.

LIST OF THE SEVERAL VIEWS OF THE FIGURES

DETAILED ACCOUNT OF WORKING EMBODIMENT OF THE INVENTION

Figure 1:
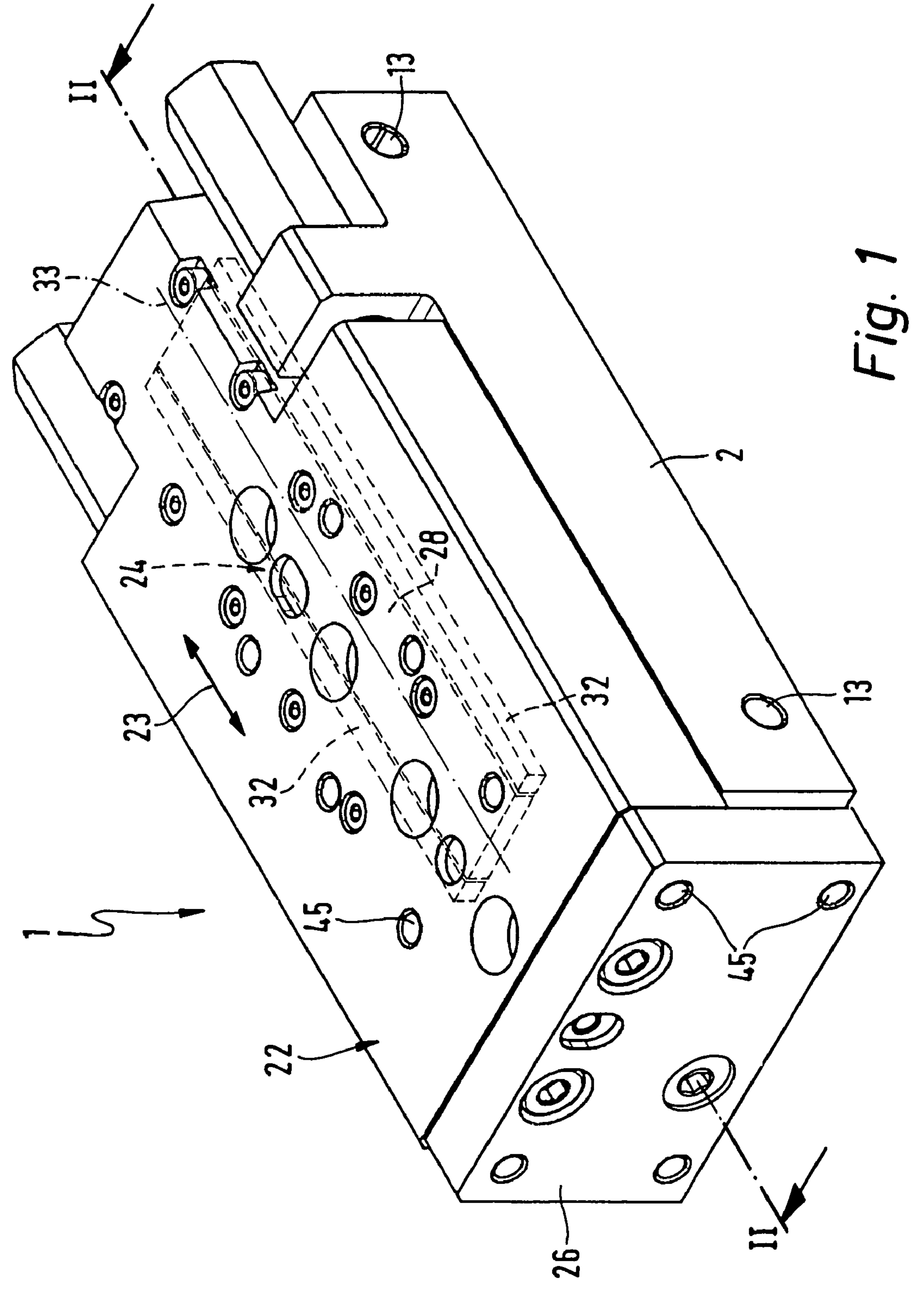
FIG. 1 is a perspective representation of a linear drive produced using the method in accordance with the invention.

The linear drive 1 figured by way of example possesses a housing 2, wherein at least one linearly extending receiving space 3 is located in which a drive piston 4 is able to run linearly. A drive rod 5, which is connected with the drive piston 4 and for instance by a screw thread, extends from the drive piston 4 in an axial direction and preferably through an end plate 6 in the form of a cover, into the surroundings. The drive piston 4 together with the drive rod 5 constitutes a drive unit 7 whose longitudinal axis 8 coincides with the longitudinal axis of the drive rod 5.

The drive piston 4 divides up the receiving space 3 axially into two working chambers 12*a* and 12*b* to each of which a separate fluid duct 13 extends (which runs through the housing) in order to selectively feed a pressure medium, for example compressed air, or to vent it and accordingly to move the drive unit 7 in a linear movement 14 as indicated by a double arrow.

The drive rod 5 is in the illustrated working example hollow and accordingly tubular in form. However it may consist of a solid material. Instead of a design involving fluid power for a drive force the linear drive may also be powered electrically. In this case an electric motor 15, indicated in chained lines, may be arranged on the housing 2 and drivingly coupled with the drive rod 5 by drive means 16, for example by a lead screw.

By suitable design of the drive means the linear drive may also be designed in the form of an electrodynamic linear direct drive. In this case the drive forces are transmitted magnetically to the drive rod.

The terminal wall 6 is provided with a guide bushing 17 through which the drive rod 5 extends in order to produce a smooth running slide guide for it.

A transverse support function for the drive rod 5 in relation to the housing 2 at its inner end in the receiving space is performed by the drive piston 4, which at its outer periphery is preferably provided with at least one guide ring 18, which is able to slide along the bore of the receiving space 3.

Figure 2:
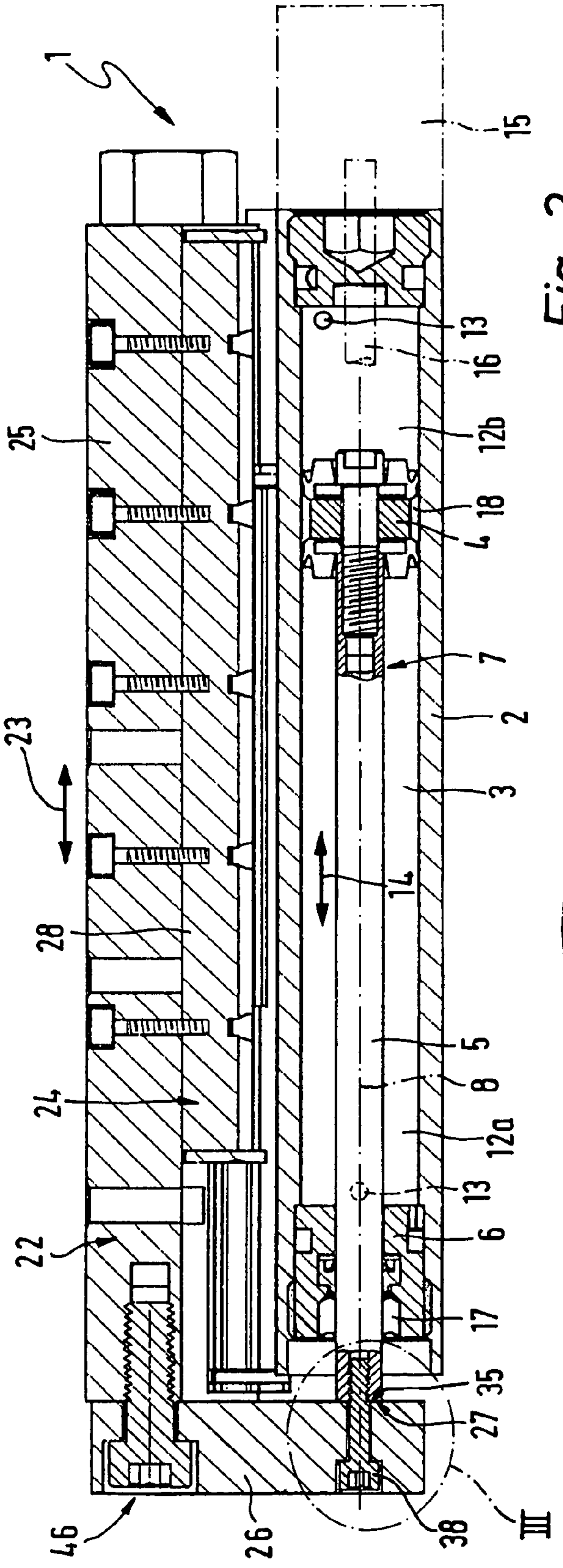
FIG. 2 shows the linear drive in accordance with FIG. 1 in a longitudinal section taken on the line II-II.

Externally on the housing 2 a guide unit 22, which in the example is designed in the form of a carriage, is guided for linear sliding motion. The linear movement, which the guide unit 22 performs in relation to the housing 2, will be termed the second linear movement 23 and is indicated in FIG. 2 by a double arrow. Its direction is parallel to the direction of the first linear movement 14 of the drive unit 7.

A preferably table-like guide section 25 of the guide unit 22 extends alongside the housing 2, the housing 2 overlapping the housing 2 in accordance with its current position axially to a greater or lesser extent. At an end side of the guide section 25 a coupling member 26, preferably in the form of a yoke plate, is arranged, which extends athwart the longitudinal axis 8 to the fore of the terminal face 27 of the terminal section, which is outside the housing 2, of the drive rod 5.

The sliding support of the guide unit 22 is provided by a linear guide means 24 arranged between the guide section 25 and the housing 2. In the working embodiment this means includes a central guide rail 28 which is flanked at the edge by two external guide rails 32 applied externally to the housing 2, a suitable number of plain and/or anti-friction bearing elements being provided between the central guide rail 28 and each external guide rail 32. The longitudinal axis 33 of the linear guide means 24 extends parallel to the longitudinal axis, coinciding with the longitudinal axis 8, of the receiving space 3.

The drive unit 7 is kinematically coupled with the guide unit 22 in the axial direction, that is to say in the direction of the linear movements 14 and 23 free of play. For this purpose a axially play-free entrainment connection is provided between the drive rod 5 and the coupling member 26 in front of it. The latter is in the form of a combination of an adhesive join and screw attachment. More details on this will be gathered from the representation of FIG. 3 on a larger scale.

The drive rod 5 has its terminal face 27 resting on a face section (termed the joint face 35) of the coupling member 26 with the interposition of a layer of adhesive 34. The adhesive 34 ensures in this case an intimate material connection between the above mentioned components.

In order to produce the additional screw connection the drive rod 5 possesses a threaded hole 36, opening at its terminal face and which is more particularly coaxial, into which the shank 37 of an attachment screw 38 is screwed, which extends through an axially directed opening 42 in the coupling member 26 from the side facing away from the drive rod 5. The head 43 of the attachment screw 38 engages support face 44, directed axially away from the drive rod 5, of the coupling member 26 so that on tightening the attachment screw 28 the drive rod 5 and the coupling member 26 are braced onto the sandwiched adhesive 34.

Preferably the support face 44 is located in a recess in the coupling member 26 receiving the full height of the screw head 43.

If by suitable actuation the first linear movement 14 of the drive unit 7 is caused in the one or other direction there will be, on the application of a thrust or a pull, a transmission of force on the guide unit 22, which accordingly synchronously performs the second linear movement 25. The latter may be transferred from the guide unit 22 in order to for example shift or position a component of a machine, a gripper employed for handling parts or some other component. For the detachable fixing of component the guide unit 22 is provided with suitable attachment means 45, for example in the form of threaded holes.

In order to ensure the lowest possible wear rate during operation of the linear drive 1 the two linear movements 14 and 23 should be in exact parallelism. If the screw connection between the coupling member 26 and the drive rod 5 were to be produced without additional measures the pull moment then applied would however impair the parallel running of the two linear movements 14, something which would entail stiff running in the linear guide means 24 and at the guide bushing 17 and the guide ring 18. Accordingly the orderly, skew-free movement would not be possible, more particularly in the case of linear drives with a small overall size. Furthermore there would be more wear.

The linear drive in the example is in fact also manufactured using a particular method, which renders possible complete transmission of force with the aid of a screw connection while simultaneously ensuring smooth running in operation.

In this method of manufacture the linear drive may be completely assembled exclusive of the production of the entrainment connection between the drive rod 5 and the coupling member 26. After a series of production steps there is therefore a linear drive 1, in which both the drive unit 7 and also the guide unit 22 are arranged in a linearly adjustable manner on the housing 2, though not having any entrainment connection so that there is independent mobility.

After this adhesive 34 s applied on the terminal face 27 of the drive rod 5 and/or on the joint face 35 of the coupling member 26 and then the two faces are thrust together by a force in opposite directions acting on the guide unit 22 and the drive unit 7.

Figure 3:
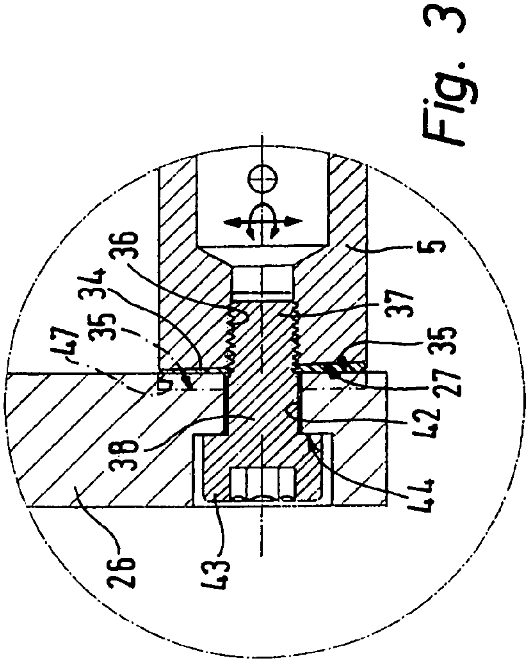
FIG. 3 shows the part marked III in FIG. 2 on a larger scale.

In the next step the attachment screw 38 is introduced from the outside through the opening 42 and screwed into the threaded hole 36. It is tightened a little so that the adhesive connection between the coupling member 36 and the drive rod 5 remains intact, despite simultaneous relative movement athwart the shift direction of the drive rod 5 and the guide unit 22 between such components. This possibility of motion can, as shown in FIG. 3 by arrows, mean that the components may be shifted or pivoted in relation to each other.

In this preliminarily secured position held by the attachment screw 38 the entire movement unit 46 comprising the guide unit 22 and the drive unit 7 is shifted once or several times between its two terminal stroke positions in relation to the housing 2. This preferably takes place by the action of force from the outside on the guide unit 22, either mechanically or manually.

This movement, called the alignment movement, of the movement unit 46, takes place before the adhesive 34 is cured or hardened. Accordingly the guide unit 22 and the drive unit 7 may be exactly aligned in relation to one another in accordance with the directions of the set first and second linear movements 14 and 23.

After completion of the alignment movement the system is left alone until the adhesive 34 is cured. Such curing may occur relatively rapidly, if for example a suitable two component adhesive or an ultraviolet cured adhesive is utilized.

Once the adhesive is in fact cured, it will undertake the function of a filling or compensation composition supporting the drive rod 5 in relation to the guide unit 22 and holding it fixedly in position, even when later the attachment screw 38 is tightened with the necessary torque for the transmission of force required for operation. It is accordingly now possible to finalize the screw connection without any danger of the drive rod 5 and the coupling member 26 losing their relative positions owing to a possible irregularity as regards the terminal face 27 and the joint face 35.

FIG. 3 now shows a final state, the guide face 35 and the terminal face 27 being slightly oblique in relation to each other—something representing the optimum state for the system in the example—the sandwiched adhesive maintaining such alignment despite any pull force in view of the attachment screw 38.

In the working embodiment on its side facing the drive rod 5 the coupling member 26 is smooth and preferably continuously even in its configuration. The joint face 35 cooperating with the terminal face 27 or, respectively, the adhesive 34 is therefore not peripherally limited so that the applied adhesive, which during the alignment movement may be squeezed out, may flow away.

On the one hand it may be an advantage to secure the adhesive mechanically in a certain fashion after application thereof. If it is desired, on the side facing the drive rod 5 the coupling member 26 may be provided with a recess 47 concentric to the opening 42, into which the terminal side of the drive rod 5 may be inserted a little and whose floor represents the joint face 35. Such an alternative design is indicated in FIG. 3 in chained lines.

The method as explained may not only be employed in order to align a drive rod in relation to a guide unit 22. In a like fashion a guide rod could be joined with a guide unit, even the guide unit itself being able to have a guide rod as a guide section, which is then able to be connected in accordance with the invention by way of a yoke-like coupling member with the other guide rod and/or possibly even with an additional drive rod.

The screw connection may instead of only one attachment screw 38 have a plurality of attachment screws, if the diameter of the rod to be connected permits this.

The invention claimed is:

1. A method for the production in a linear drive of an axially play-free entrainment connection between at least one rod mounted for linear displacement and a guide unit adapted to slide linearly in parallelism to the rod, a coupling member of the guide unit extending to the fore of an end face of the rod and being adhesively bonded to the rod when the entrainment connection has been produced, wherein, after the application of the adhesive, the coupling member is screwed by means of at least one attachment screw in such a manner axially to the rod that relative movements between the coupling member and the rod remain possible athwart the direction of displacement, and wherein, even prior to curing of the adhesive, a movement unit comprising the guide unit and the rod is shifted axially at least once between its two stroke end positions in relation to a housing of the linear drive, and wherein, after the following curing of the adhesive, the final screwing tight of the attachment screw is performed.

2. The method as set forth in claim 1, wherein a shank of the attachment screw is inserted through an opening in the coupling member and screwed into a threaded hole in the rod, such hole opening at a terminal face of the rod.

3. The method as set forth in claim 1, wherein a joining face facing the rod is provided at the floor of a recess, rendering possible insertion of the end of the rod, in the coupling member into which recess the adhesive is introduced.

4. The method as set forth in claim 1, wherein a peripherally limited face section of the coupling member is provided as a joining face facing the rod.

5. The method as set forth in claim 1, wherein the movement unit is reciprocated several times between its stroke end positions prior to curing of the adhesive.

6. The method as set forth in claim 1, wherein at least one rod is constituted by a drive rod of the linear drive.

7. The method as set forth in claim 1, wherein said linear drive is driven by fluid force or electrically.

8. The method as set forth in claim 1, wherein said guide unit is designed carriage-like.

9. The method as set forth in claim 1, wherein said coupling member is in the form of a yoke plate.

* * * * *

UNITED STATES PATENT AND TRADEMARK OFFICE
CERTIFICATE OF CORRECTION

PATENT NO. : 7,845,060 B2
APPLICATION NO. : 10/591141
DATED : December 7, 2010
INVENTOR(S) : Bauer et al.

It is certified that error appears in the above-identified patent and that said Letters Patent is hereby corrected as shown below:

Column 1, line 5:

Now reads: "The invention relates"

Should read: --FIELD OF THE INVENTION
The invention relates--

Column 1, line 13:

Now reads: "FIELD OF THE INVENTION"

Should read: --BACKGROUND OF THE INVENTION--

Column 1, line 38:

Now reads: "it by a-plain adhesive join."

Should read: --it by a plain adhesive join.--

Column 1, line 50:

Now reads: "One object of the present invention"

Should read: --SUMMARY OF THE INVENTION
One object of the present invention--

Signed and Sealed this
Thirty-first Day of July, 2012

David J. Kappos
*Director of the United States Patent and Trademark Office*